United States Patent [19]
Vitunic

[11] Patent Number: 5,689,167
[45] Date of Patent: Nov. 18, 1997

[54] TWO-PHASE ELECTRONIC CONTROL OF A THREE-PHASE INDUCTION MOTOR

[75] Inventor: Mark Robert Vitunic, San Jose, Calif.

[73] Assignee: Micro Linear Corporation, San Jose, Calif.

[21] Appl. No.: 547,592

[22] Filed: Oct. 24, 1995

[51] Int. Cl.⁶ .................................................. H02P 7/00
[52] U.S. Cl. ........................................ 318/767; 318/811
[58] Field of Search ........................... 318/747, 770, 318/767, 798–815, 816, 817, 794, 795, 797, 768, 748, 749, 786, 785, 685, 769; 323/220, 227; 363/43, 98, 63, 48, 101, 36, 40, 41, 126, 129, 142

[56] References Cited

U.S. PATENT DOCUMENTS

| | | | |
|---|---|---|---|
| 4,008,421 | 2/1977 | Bird | 318/729 |
| 4,101,821 | 7/1978 | Kirby | 323/119 |
| 4,482,961 | 11/1984 | Kilner et al. | 364/428 |
| 4,680,526 | 7/1987 | Okuyama et al. | 318/802 |
| 4,825,132 | 4/1989 | Gritter | 318/811 |
| 4,928,043 | 5/1990 | Plunkett | 318/254 |
| 4,962,339 | 10/1990 | Schauder | 318/798 |
| 5,009,186 | 4/1991 | Rippel et al. | 318/803 |
| 5,032,771 | 7/1991 | Kerkman et al. | 318/52 |
| 5,066,899 | 11/1991 | Nashiki | 318/807 |
| 5,206,543 | 4/1993 | Takita et al. | 307/352 |
| 5,218,283 | 6/1993 | Wills et al. | 363/98 X |
| 5,231,339 | 7/1993 | Kishimoto et al. | 318/807 |
| 5,247,237 | 9/1993 | Koyama et al. | 318/808 |
| 5,252,905 | 10/1993 | Wills et al. | 318/807 |
| 5,278,486 | 1/1994 | Kim | 318/811 |
| 5,304,911 | 4/1994 | Anderson | 318/729 |
| 5,334,923 | 8/1994 | Lorenz et al. | 318/805 |
| 5,345,160 | 9/1994 | Corniere | 318/811 |

OTHER PUBLICATIONS

Gottlieb, I. M., *Electric Motors & Control Techniques*, 2nd Ed., pp. 147–149, 235–247, TAB Books, 1994.

Primary Examiner—Jonathan Wysocki
Attorney, Agent, or Firm—Haverstock & Associates

[57] ABSTRACT

A circuit for powering a three-phase AC induction motor. The circuit generates a first signal of the form Vdc+A sin ($2\pi ft-0°$) and a second signal of the form Vdc+A sin ($2\pi ft-90°$) as is done in conventional circuits for powering two-phase AC induction motors. A vector summation circuit is used to create a third signal from the first two signals. The third signal is of the form Vdc+A sin ($2\pi ft+60°$). The first signal is input to a first error amplifier along with a first sampled difference signal from the motor. The third signal is input to a second error amplifier along with a second sampled difference signal from the motor. The outputs from each of the first and second amplifiers is input into a first comparator and a second comparator along with a sawtooth waveform to create a first sinusoidally modulated square wave signal and a second sinusoidally modulated square wave signal. The first and second sinusoidally modulated square wave signals are fed to driver circuits which in turn control an H-bridge circuit for powering the motor from a DC bus. Therefore, the invention achieves two-phase control of a three-phase AC induction motor.

20 Claims, 8 Drawing Sheets

TWO-PHASE ELECTRONIC CONTROL OF A THREE-PHASE INDUCTION MOTOR

FIELD OF THE INVENTION

The invention relates to the field of circuits for powering electric motors. In particular, the invention relates to circuits for powering three-phase AC induction motors.

BACKGROUND OF THE INVENTION

Three sinusoidal signals are required to power a three-phase AC induction motor. The three signals should have the same frequency and amplitude, yet should each be separated in phase by 120° with respect to the other two. In particular, a first signal should be of the form Vdc+A sin (2πft−0°), a second signal should be of the form Vdc+A sin (2πft−120°) and a third signal should be of the form Vdc+A sin (2πft−240°). In order to vary the operating speed of the motor, the frequency of each of these signals must be varied while keeping the frequency of each signal equal to the frequency of the other signals. Therefore, circuits for controlling the speed of a three-phase AC induction motor are generally complex.

One prior art circuit for creating these three signals uses a reference sinusoid as the 0° phase-shifted signal and a waveform digital-to-analog converter with two look-up tables to create the 120° and 240° phase-shifted signals. This circuit also has the disadvantage of being relatively complex.

In contrast to three-phase AC induction motors, two-phase AC induction motors require only two sinusoidal signals of equal amplitude and frequency, but that are out of phase with respect to each other by 90°. In particular, a first signal should be of the form Vdc+A sin (2πft−0°) and a second signal should be of the form Vdc+A sin (2πft−90°). Circuits for producing these two signals are less complex than the above-described circuits for producing signals for powering three-phase AC induction motors.

Therefore, an object of the present invention is to produce signals for powering a three-phase AC induction motor with a circuit which is less complex than conventional circuits for powering three-phase AC induction motors. It is a further object of the present invention to produce signals for powering a three-phase induction motor with a circuit which is of comparable complexity to circuits for powering two-phase AC induction motors.

SUMMARY OF THE INVENTION

The invention is a circuit for powering a three-phase AC induction motor. The circuit generates a first signal of the form Vdc+A sin (2πft−0°) and a second signal of the form Vdc+A sin (2πft−90°) as is done in conventional circuits for powering two-phase AC induction motors. A vector summation circuit is used to create a third signal from the first two signals. The third signal is of the form Vdc+A sin (2πft+60°). The first signal is input to a first error amplifier along with a first sampled difference signal from the motor. The third signal is input to a second error amplifier along with a second sampled difference signal from the motor. The outputs from each of the first and second amplifiers is input into a first comparator and a second comparator along with a sawtooth waveform to create a first sinusoidally modulated square wave signal and a second sinusoidally modulated square wave signal. The first and second sinusoidally modulated square wave signals are fed to driver circuits which in turn control an H-bridge circuit for powering the motor from a DC bus.

Therefore, the invention achieves two-phase control of a three-phase AC induction motor.

DETAILED DESCRIPTION OF THE PREFERRED EMBODIMENT

Figure 1:
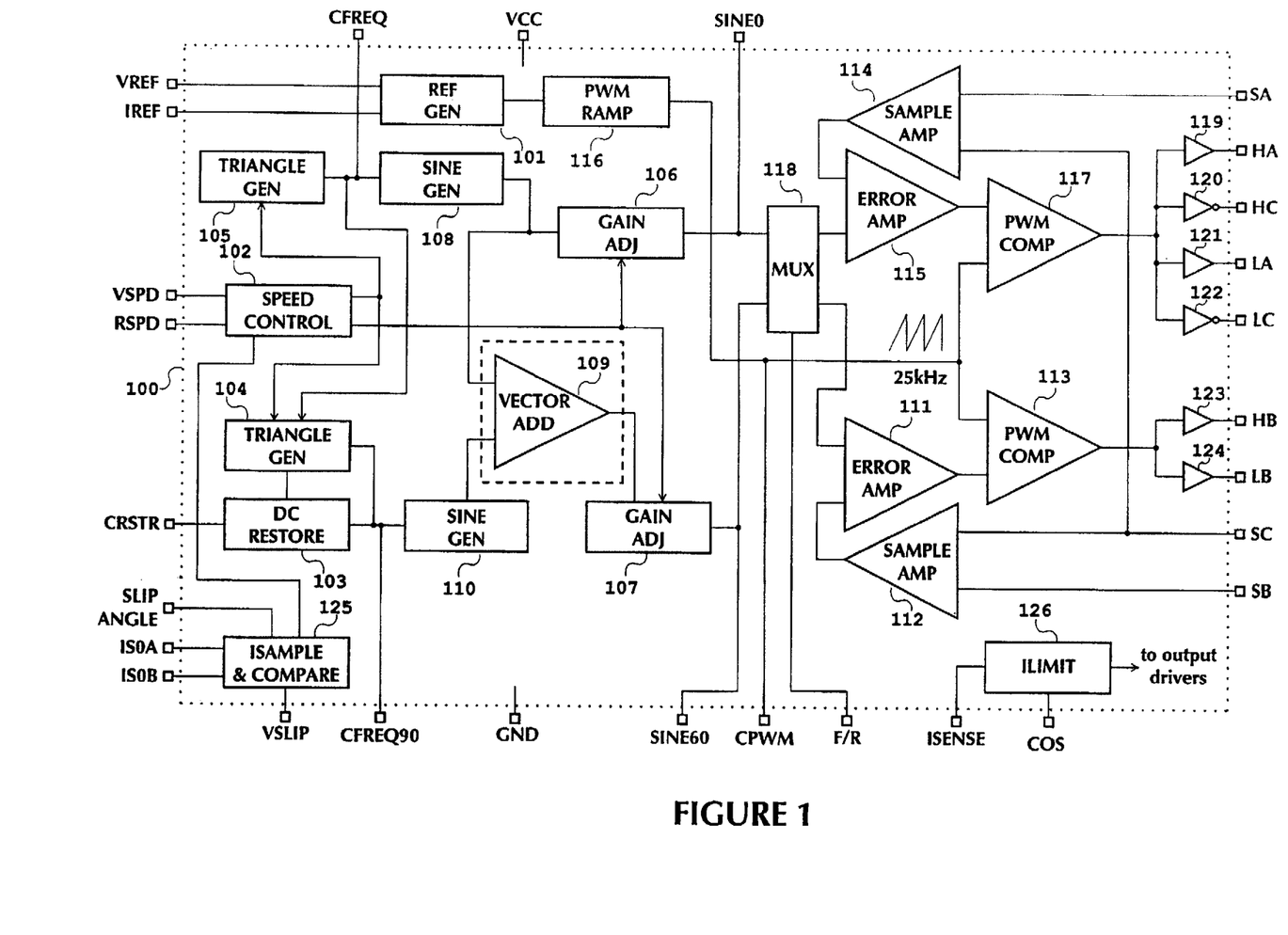
FIG. 1 shows a schematic diagram of the controller of the preferred embodiment of the present invention.

Referring to FIG. 1, a schematic diagram of the controller 100 of the preferred embodiment of the present invention is shown. A terminal VREF of the controller 100 is coupled to a reference voltage output of a reference generator 101. A terminal IREF of the controller 100 is coupled to the reference generator 101 for setting constant currents for the reference generator 101 and other circuits of the controller 100. A terminal VSPD of the controller 100 is coupled to a speed controller 102 for controlling the output amplitude and frequency of signals output to the AC motor. A terminal RSPD of the controller 100 is coupled to the speed controller 102 for setting a current proportional to the voltage applied to the speed controller 102. A terminal CRSTR of the controller 100 is coupled to a DC restore circuit 103 for setting a one shot time period for DC voltage restoration of the triangle generator 104 output.

A first output of the speed controller 102 is coupled to a first input to a triangle generator 104 and to an input to a triangle generator 105 for setting frequency. A second output from the speed controller 102 is coupled to an input to a gain adjust circuit 106 and to an input to a gain adjust circuit 107 for setting amplitude. An output of the triangle generator 105 is coupled to an input to a sine generator 108, to a CFREQ terminal of the controller 100 for frequency setting and to a second input to the triangle generator 104. An output from the sine generator 108 is coupled to an input to the gain adjust circuit 106 and to a first input to a vector addition circuit 109. An output from the triangle generator 104 is coupled to an input to a sine generator 110, to the DC restore circuit 103 and to a CFREQ90 terminal of the controller 100 for frequency setting.

An output from the sine generator 110 is coupled to a second input to the vector add circuit 109. An output from the vector add circuit 109 is coupled to an input to the gain adjust circuit 107. An output of the gain adjust circuit 106 is coupled to a first input to the MUX 118 and coupled to a SINE0 output terminal of the controller 100. An output from the gain adjust circuit 107 is coupled to a second input to a MUX 118 and to a SINE60 output terminal of the controller 100. An output of the reference generator 101 is coupled to an input to a PWM ramp circuit 116. An output of the PWM ramp circuit 116 is coupled to a first input to a PWM comparator 113 and to a first input to a PWM comparator 117. A CPWM terminal of the controller 100 is coupled to the PWM ramp circuit 116 for setting the PWM frequency. A F/R terminal of the controller is coupled to a third input to the MUX 118.

A first output of the MUX 118 is coupled to a first input to an error amplifier 115. A second output from the MUX 118 is coupled to a first input to an error amplifier 111. An SC terminal of the controller 100 is coupled to a first input to a sample amplifier 112. An SB terminal of the controller is coupled to a second input to the sample amplifier 112. An output of the sample amplifier 112 is coupled to a second input to an error amplifier 111. An output of the error amplifier 111 is coupled to a second input to the PWM comparator 113. An SA terminal of the controller 100 is coupled to a first input to a sample amplifier 114. The SC terminal of the controller 100 is coupled to a second input to the sample amplifier 114. An output of the sample amplifier 114 is coupled to a second input to an error amplifier 115. An output of the error amplifier 115 is coupled to a second input to the PWM comparator 117.

An output of the PWM comparator 117 is coupled to an input to a driver 119, to an input to an inverting driver 120, to an input to a driver 121 and to an input to an inverting driver 122. An output of the PWM comparator 113 is coupled to an input to a driver 123 and to an input to a driver 124. An output of the driver 119 is coupled to an HA terminal of the controller 100. An output of the inverting driver 120 is coupled to an HC terminal of the controller 100. An output of the driver 123 is coupled to an HB terminal of the controller 100. An output of the driver 121 is coupled to an LA terminal of the controller 100. An output of the inverting driver 122 is coupled to an LC terminal of the controller 100. An output of the driver 124 is coupled to an LB terminal of the controller 100. An ISOA terminal of the controller is coupled to a first terminal of a sample and compare circuit 125 and an ISOB terminal of the controller is coupled to a second terminal of the sample and compare circuit 125 for sensing a motor winding current. A SLIP ANGLE terminal of the controller 100 is coupled to a third terminal of the sample and compare circuit 125 for setting the slip angle. A VSLIP terminal of the controller is coupled to a fourth terminal of the sample and compare circuit 125 and a fifth terminal of the sample and compare circuit is coupled to the speed controller 102 for increasing the motor signal amplitude when a slip angle (a phase difference between voltage and current for a motor winding) increases. The slip angle tends to increase as motor loading increases. The sample and compare circuit 125 reduces the slip angle for the motor winding by increasing the motor winding signal amplitudes when the motor loading increases.

An ISENSE terminal of the controller 100 is coupled to an input to a current limit circuit 126 for sensing motor winding current. A COS terminal of the controller 100 is coupled to the current limit circuit 126 for setting an off-time for the constant off-time PWM controlled current limit circuit 126. An output of the current limit circuit 126 is coupled to the drivers 119-124 for limiting winding currents.

A VCC terminal of the controller is coupled to provide power to the active circuits of the controller 100. A GND terminal of the controller 100 is coupled to provide a return path for current from the VCC terminal.

Figure 2:
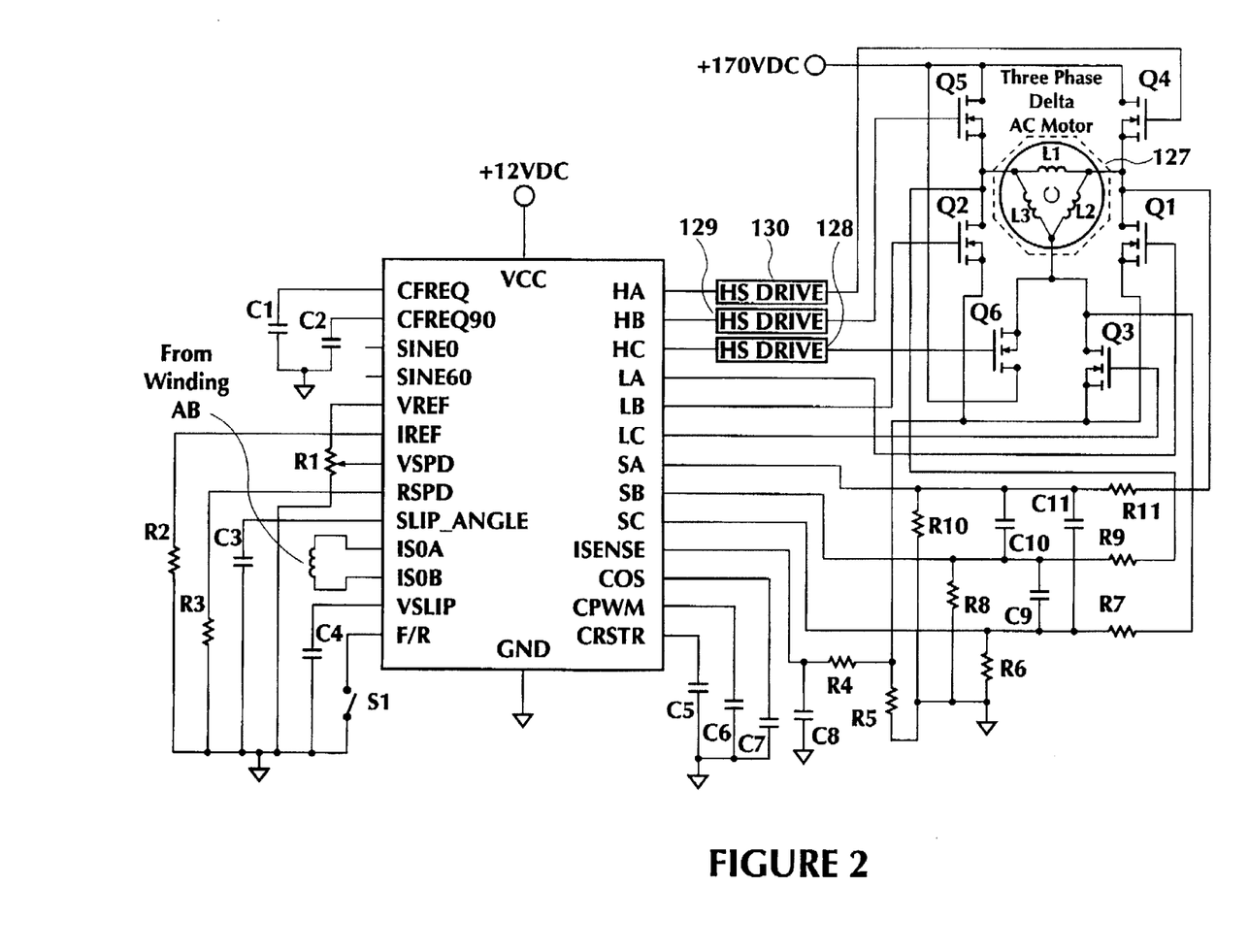
FIG. 2 shows a schematic diagram of the circuits external to the controller of the preferred embodiment of the present invention.

Referring to FIG. 2, a schematic diagram of the circuits external to the controller 100 of the preferred embodiment of the present invention are shown. A 12 volt dc supply is coupled to the VCC terminal of the controller 100. A first terminal of a capacitor C1 is coupled to the CFREQ terminal of the controller 100. A second terminal of the capacitor C1 is coupled to the ground node. A first terminal of a capacitor C2 is coupled to the CFREQ90 terminal of the controller 100. A second terminal of the capacitor C2 is coupled to the ground node. The SINE0 terminal of the controller 100 and the SINE60 terminal of the controller 100 each have no connection during normal operation, but may be used for testing purposes.

A first terminal of an adjustable resistor R1 is coupled to the VREF terminal of the controller 100. A second terminal of the adjustable resistor R1 is coupled to the ground node. A center adjustable terminal of the adjustable resistor R1 is coupled to the VSPD terminal of the controller 100. A first terminal of a resistor R2 is coupled to the IREF terminal of the controller 100. A second terminal of the resistor R2 is coupled to ground node. A first terminal of a resistor R3 is coupled to the RSPD terminal of the controller 100. A second terminal of the resistor R3 is coupled to the ground node. A first terminal of a capacitor C3 is coupled to the SLIP ANGLE terminal of the controller 100. A second terminal of the capacitor C3 is coupled to the ground node. A first terminal of a current sense transducer AB for sensing a current representative of a current in a winding L1 of a three phase induction motor 127 is coupled to the ISOA terminal of the controller 100. A second terminal of the transducer AB is coupled to the ISOB terminal of the controller 100.

A first terminal of a capacitor C4 is coupled to the VSLIP terminal of the controller 100. A second terminal of the capacitor C4 is coupled to the ground node. A first terminal of a switch S1 is coupled to the F/R terminal of the controller 100. A second terminal of the switch S1 is coupled to the ground node. A GND terminal of the controller is coupled to a ground terminal of the 12 volt dc supply. A first terminal of a capacitor C5 is coupled to the CRSTR terminal of the controller 100. A second terminal of the capacitor C5 is coupled to the ground node. A first terminal of a capacitor C6 is coupled to the CPWM terminal of the controller 100. A second terminal of the capacitor C6 is coupled to the ground node. A first terminal of a capacitor C7 is coupled to the COS terminal of the controller 100. A second terminal of the capacitor C7 is coupled to the ground node.

A first terminal of a capacitor C8 is coupled to the ISENSE terminal of the controller 100 and to a first terminal of a resistor R4. A second terminal of the capacitor C8 is coupled to the ground node. A second terminal of the resistor R4 is coupled to a first terminal of a resistor R5, to a source of a NMOSFET Q1, to a source of a NMOSFET Q2 and coupled to a source of an NMOSFET Q3. A second terminal of the resistor R5 is coupled to the ground node. A gate of the transistor Q1 is coupled to the LA terminal of the controller 100. A gate of the transistor Q2 is coupled to the LB terminal of the controller 100. A gate of the transistor Q3 is coupled to the LC terminal of the controller 100.

A first terminal of a resistor R6 is coupled to the SC terminal of the controller 100, to a first terminal of a capacitor C9, to a first terminal of a capacitor C11, and coupled to a first terminal of a resistor R7. A second terminal of the resistor R6 is coupled to the ground node. A second terminal of the capacitor C9 is coupled to the SB terminal of the controller 100, to a first terminal of a resistor R8, to a first terminal of a capacitor C10, and coupled to a first terminal of a resistor R9. A second terminal of the resistor R8 is coupled to the ground node. A second terminal of the capacitor C10 is coupled to the SA terminal of the controller 100, to a first terminal of a resistor R10, to a second terminal of the capacitor C11 and coupled to a first terminal of a resistor R11. A second terminal of the resistor R10 is coupled to the ground node.

A second terminal of the resistor R7 is coupled to a drain of the transistor Q3, to a first terminal of a winding L2 of the motor 127, to a first terminal of a winding L3 of the motor 127, and coupled to a source of an NMOSFET Q6. A second terminal of the resistor R9 is coupled to a drain of the transistor Q2, to a second terminal of the winding L3, to the first terminal of the winding L1, and coupled to a source of an NMOSFET Q5. A second terminal of the resistor R11 is coupled to a drain of the transistor Q1, to a second terminal of the winding L2, to a second terminal of the winding L1, and coupled to a source of an NMOSFET Q4. A gate of the transistor Q6 is coupled to an output of a high side driver 128. An input of the high side driver 128 is coupled to the HC terminal of the controller 100. A gate of the transistor Q5 is coupled to an output of a high side driver 129. An input of the high side driver 129 is coupled to the HB terminal of the controller 100. A gate of the transistor Q4 is coupled to an output from a high side driver 130. An input of the high side driver 130 is coupled to the HA terminal of the controller 100. A high voltage DC bus is coupled to a drain of the transistor Q4, to a drain of the transistor Q5, and coupled to a drain of the transistor Q6. In the preferred embodiment, the high voltage bus is powered to +170 volts DC.

Referring to FIG. 1, the sine generator 108 generates a signal of the form Vdc+A sin (2πft−0°) under control of its input signals. This generated signal is amplitude adjusted by the gain adjust circuit 106 and is coupled to the first input to the error amplifier 115 (through the MUX 118). A sampled voltage signal from a first phase of the motor 127 is received by the SA terminal of the controller 100 and a sampled voltage signal from a third phase of the motor 127 is received by the SC terminal of the controller 100. These sampled signals are input to the sample amplifier 114. The output of the sample amplifier 114 is representative of a difference signal (SA−SC) which will have, due to negative feedback, the same phase shift (0°) as the signal from the gain adjust circuit 106 which is coupled to the first input to the error amplifier 115 (through the MUX 118). The difference signal (SA−SC) is coupled to the second input to the error amplifier 115. The output of the error amplifier 115 is a first error signal representative of a difference between an actual motor voltage and a desired motor voltage and approximates a sinusoid.

The sine generator 110 generates a signal of the form Vdc+A sin (2πft−90°) under control of its input signals. This generated signal is input to the vector add circuit 109 along with the signal output from the sine generator 108 to form a signal at the output of the vector add circuit 109 of the form Vdc+A sin (2πft+60°). The vector add circuit 109 is shown and described in more detail with reference to FIG. 3. The signal at the output of the vector add circuit 109 is amplitude adjusted by the gain adjust circuit 107 and is coupled to the first input to the error amplifier 111 (through the MUX 118). The sampled voltage signal from the third phase of the motor 127 is received by the SC terminal of the controller 100 and a sampled voltage signal from a second phase of the motor 127 is received by the SB terminal of the controller 100. These sampled signals are input to the sample amplifier 112. The output of the sample amplifier 112 is representative of a difference signal (SB−SC) which will have, due to negative feedback, the same phase shift (+60°) as the signal from the gain adjust circuit 107 which is coupled to the first input to the error amplifier 111 (through the MUX 118). The difference signal (SB−SC) is input to the second input to the error amplifier 111. The output of the error amplifier 111 is a second error signal representative of a difference between an actual motor voltage and a desired motor voltage and approximates a sinusoid.

The first input to the MUX 118 is internally coupled to the first output to the MUX 118 and the second input to the MUX 118 is internally coupled to the second output of the MUX 118, or the first input to the MUX 118 is internally coupled to the second output of the MUX 118 and the second input to the MUX 118 is internally coupled to the first output of the MUX 118, depending upon the logic state of the F/R digital input. The F/R input to the MUX circuit 118 controls the direction the motor 127 turns. If the F/R input is a logical high voltage, the SINE0 signal is directed to the error amplifier 115 and the SINE60 signal is directed to the error amplifier 111. If the F/R input is set to a logical low voltage, the SINE60 signal is directed to the error amplifier 115 and the SINE0 signal is directed to the error amplifier 111. Therefore, depending upon the logic level coupled to the F/R input, the second output of the MUX 118 will either "lead" or "lag" the first output of the MUX 118 by 60°; this will also be the case of the motor feedback signals (SA−SC) and (SB−SC).

The output of the error amplifier 115 is input to the PWM circuit 117 along with the sawtooth waveform from the PWM ramp circuit 116 to form a first approximately sinusoidally pulse width modulated square wave error signal at the output of the PWM circuit 117. The output of the error amplifier 111 is input to the PWM circuit 113 along with sawtooth waveform from the PWM ramp circuit 116 to form a second approximately sinusoidally pulse width modulated square wave error signal at the output of the PWM circuit 113. The first approximately sinusoidally pulse width modulated square wave error signal output from the PWM circuit 117 control the drivers 119–122. The second approximately sinusoidally pulse width modulated square wave error signal output from the PWM circuit 113 control the drivers 123–124.

The drivers 119–124 are buffers (inverting or non-inverting) that convert the zero-to-five volts digital input signal to a zero-to-twelve volts analog signal with sufficient current driving capability (for sourcing and sinking current) to switch the gates of Q1–Q6 at the required speeds.

As can be seen from FIG. 2, the driver circuits 119–124 of FIG. 1 control the transistors Q1–Q6 for powering the motor 127 from the +170 volt bus. The circuit coupled to the 170 volt dc bus is known in the art and referred to as a three-phase H-bridge arrangement comprising three half-bridges having three upper transistors Q4–Q6 and three lower transistors Q1–Q3. At any given time, three transistors of Q1–Q6 are on (two upper and one lower or two lower and one upper) and three are off. Ideally, all current flows through the motor 127 (i.e. there is no dc component and no cross conduction; cross conduction occurs when current flows when both transistors in a given half bridge are on at the same time—this sometimes occurs during switching). The high side drivers 128–130 amplify and level shift the zero-to-twelve volts signals at the HA, HB, and HC terminals so that the upper transistors Q4–Q6 can turn on with low on resistance. This requires a gate voltage greater than the motor 127 voltage (e.g. +170 volts dc).

Figure 3:
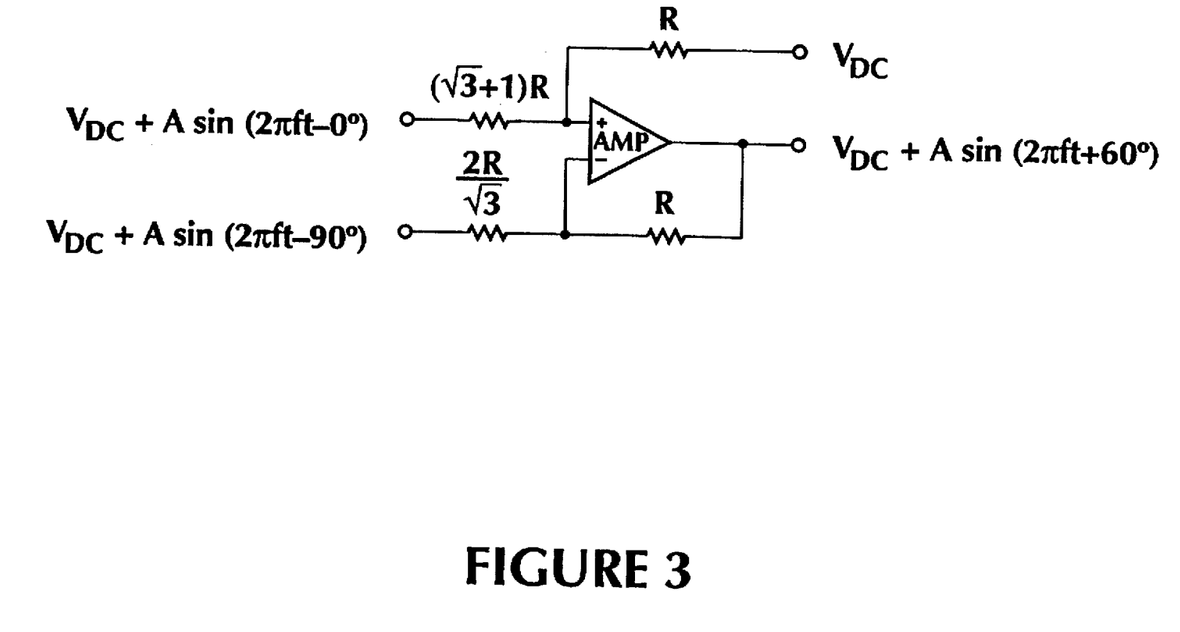
FIG. 3 shows a schematic diagram of the vector summation circuit of the present invention.

Referring to FIG. 3, a schematic diagram of the vector summation circuit 109 (FIG. 1) of the present invention is shown. A signal of the form Vdc+A sin (2πft−0°) is generated by the sine generator 108 (FIG. 1) and applied to a first node. A signal of the form Vdc+A sin (2πft−90°) is generated by the sine generator 110 (FIG. 1) and applied to a second node. The first node is coupled to a first terminal of a resistor having a resistance value of R($\sqrt{3}$+1)(approximately 2.73 R). A second terminal of the resistor having a resistance value of R($\sqrt{3}$+1) (approximately 2.73 R) is coupled to a non-inverting input to an amplifier AMP and coupled to a first terminal of a first resistor having a resistance value of R. A second terminal of the first resistor having a resistance value of R is coupled to receive a DC voltage from a supply Vdc.

The second node is coupled to a first terminal of a resistor having a resistance value of 2 R divided by the square root of 3 (approximately 1.154 R). A second terminal of the resistor having a resistance value of 2 R divided by the square root of 3 is coupled to an inverting input to the amplifier AMP and coupled to a first terminal of a second resistor having a resistance value of R. A second terminal of the second resistor having a resistance value of R is coupled to an output of the amplifier AMP and coupled to a third node. The circuit of FIG. 3 generates a signal at the third node of the form Vdc+A sin (2πft+60°) which is used by the circuit of FIG. 1 as described above.

Figure 4:
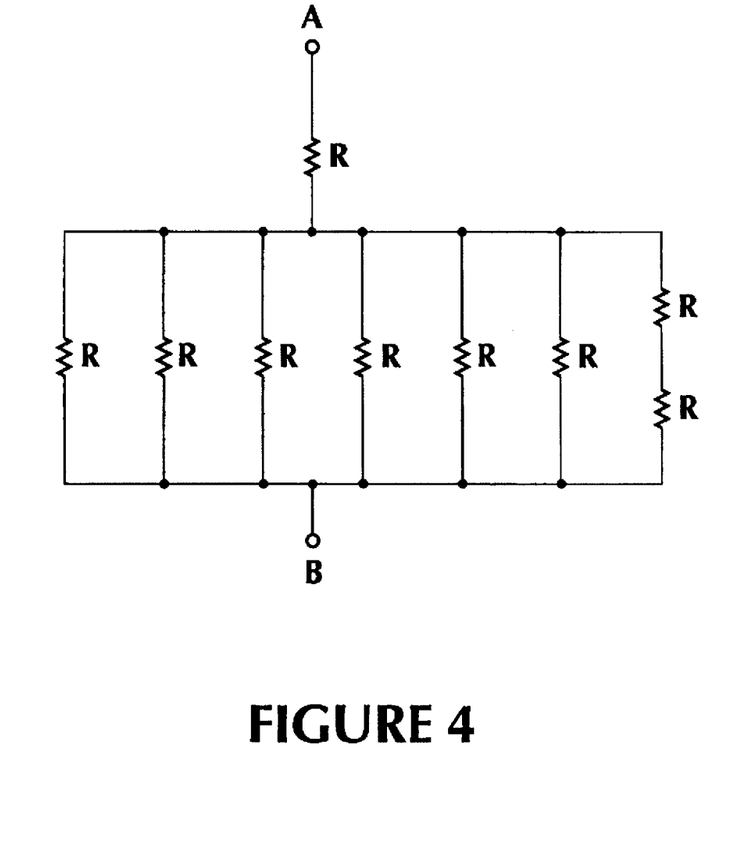
FIG. 4 shows a schematic diagram of a resistive circuit having a resistance of approximately 1.154 R.

Referring to FIG. 4, a schematic diagram of a resistive circuit having a resistance of approximately 1.154 R is shown. This circuit is preferred because it uses 9 equivalent resistors. A first node A is coupled to a first terminal of a first resistor having a resistance value of R. A second terminal of the first resistor is coupled to a first terminal of a second resistor having a resistance value of R, to a first terminal of a third resistor having a resistance value of R, to a first terminal of a fourth resistor having a resistance value of R, to a first terminal of a fifth resistor having a resistance value of R, to a first terminal of a sixth resistor having a resistance value of R, to a first terminal of a seventh resistor having a resistance value of R, and coupled to a first terminal of an eighth resistor having a resistance value of R. A second terminal of the eighth resistor is coupled to a first terminal of ninth resistor having a resistance value of R. A second terminal of the second resistor, a second terminal of the third resistor, a second terminal of the fourth resistor, a second terminal of the fifth resistor, a second terminal of the sixth resistor, a second terminal of the seventh resistor, and a second terminal of the ninth resistor are coupled to a node B.

The resistance between node A and node B approximates 1.154 R. The circuit shown in FIG. 4 can be used to form the resistor of FIG. 3 having a resistance value of 2 R divided by the square root of 3.

Figure 5:
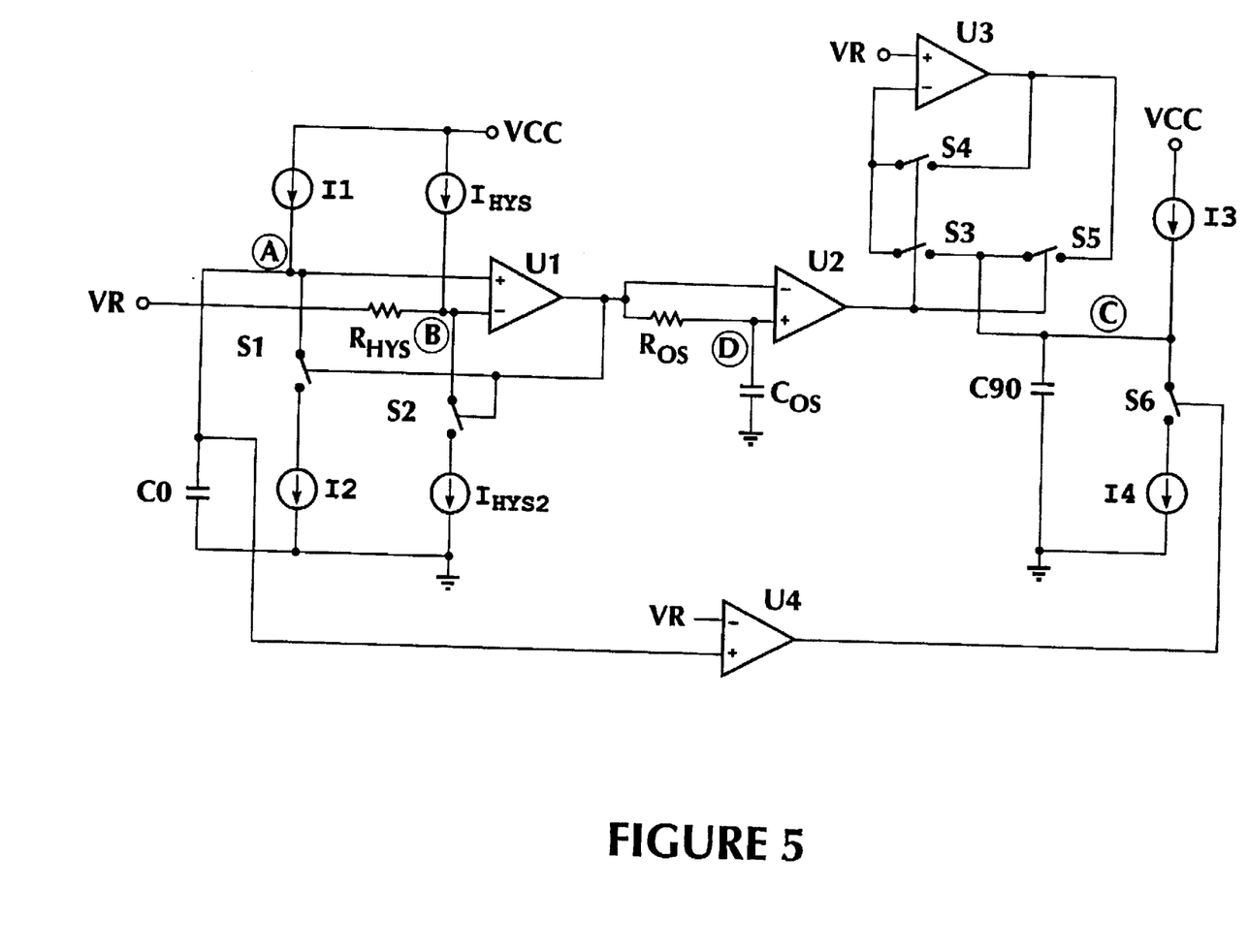
FIG. 5 shows a more detailed schematic diagram of the circuit for generating the 0° and 90° phase shifted triangle wave signals.

FIG. 5 shows a more detailed schematic diagram of the circuit for generating the 0° and 90° phase shifted triangle wave signals. The circuit shown in FIG. 5 comprises the triangle generator 104, the triangle generator 105 and the DC restore circuit 103 shown in FIG. 1. A first terminal of a current source I1 is coupled to a voltage supply node VCC. A second terminal of the current source I1 is coupled to a non-inverting input to a comparator U1, to a first terminal of a capacitor C0, to a non-inverting input to a comparator U4 and coupled to a first terminal of a switch S1, comprising a node A. A second terminal of the capacitor C0 is coupled to the ground node.

A first terminal of a current source IHYS is coupled to the node VCC. A second terminal of a current source IHYS is coupled to a first terminal of a resistor RHYS, to an inverting input to the comparator U1 and coupled to a first terminal of a switch S2, comprising a node B. A second terminal of the resistor RHYS is coupled to the reference voltage level VR. A second terminal of the switch S1 is coupled to a first terminal of a current source I2. A second terminal of the current source I2 is coupled to the ground node. A second terminal of the switch S2 is coupled to a first terminal of a current source IHYS2. A second terminal of the current source IHYS2 is coupled to the ground node.

An output of the comparator U1 is coupled to control the switches S1 and S2, and is coupled to a inverting input to a comparator U2 and coupled to a first terminal of a resistor ROS. A second terminal of the resistor ROS is coupled to a non-inverting input to the comparator U2 and to a first terminal of a capacitor COS. A second terminal of the capacitor COS is coupled to the ground node. An output of the comparator U2 is coupled to control a switch S3, a switch S4 and a switch S5. The reference voltage VR is coupled to a non-inverting input to a amplifier U3.

An output of the amplifier U3 is coupled to a first terminal of the switch S4 and coupled to a first terminal of the switch S5. A second terminal of the switch S4 is coupled to an inverting input to the amplifier U3 and to a first terminal of a switch S3. A second terminal of the switch S3 is coupled to a second terminal of the switch S5, to a first terminal of a capacitor C90, to a first terminal of a switch S6 and coupled to a first terminal of a current source I3. A second terminal of the capacitor C90 is coupled to the ground node. A second terminal of the current source I3 is coupled to the node VCC. A second terminal of the switch S6 is coupled to a first terminal of a current source I4. A second terminal of the current source I4 is coupled to the ground node. An output of the comparator U4 is coupled to control the switch S6.

The 0° and 90° phase shifted triangle wave signals swing equally in the positive and negative directions about the reference voltage VR. The 0° phase shifted triangle wave signal is formed at the node A. The current source I1 charges the capacitor C0 when the switch S1 is open. The current source I2 discharges the capacitor C0 when the switch S1 is closed. Preferably, I2 sources twice the current that I1 does. The currents I1 and I2 can be varied to vary the switching frequency of the output of U1.

The comparator U1 is a hysteresis comparator which switches its output level when the voltage at the node A is at either (VR+VHYS) or at (VR−VHYS). VHYS is a voltage level which is obtained by switching IHYS through the resistor RHYS at the node B. The negative of VHYS is obtained by switching (IHYS2−IHYS) through the resistor RHYS at the node B. Preferably, IHYS2 sources twice the current that IHYS does.

The 90° phase shifted triangle wave signal is formed at the node C. The current source I3 charges the capacitor C90 when the switch S6 is open and the current source I4 discharges the capacitor C90 when the switch S6 is closed. Preferably, the current source I4 sources twice as much current as the current source I3. The comparator U4 controls the switch S6 when the 0° degree phase shifted triangle waveform signal at node A is greater or lesser than VR. Thus, when the 0° degree phase shifted triangle waveform signal is at its neutral level (VR), the 90° phase shifted triangle waveform signal is at its peak level. This provides a 90° phase shift in the two waveforms.

The amplifier U3 and switches S3–S5 reset the 90° phase shifted triangle waveform signal to its neutral level (VR) when the 0° phase shifted waveform signal switches from charging to discharging C0 (i.e. when the output of U1 changes states). This is accomplished by ROS and COS causing the output of U2 to remain high for a period of time sufficient for node C to acquire the voltage level VR. This re-centers the 90° phase shifted triangle waveform signal about VR.

The switch S4 is normally closed, keeping the amplifier U3 in a balanced ready state with its output and the inverting input at VR. When the pulse from U2 occurs, the switches S3 and S5 will close and switch S4 will open. At this time, there may be a difference between VR and node C. If so, current will flow to bring node C to VR. Because the inputs to U3 are at the same voltage level and there is a small current through S3, the voltage at node C will be forced to VR by current through switch S5 from the output of U3.

Figure 6:
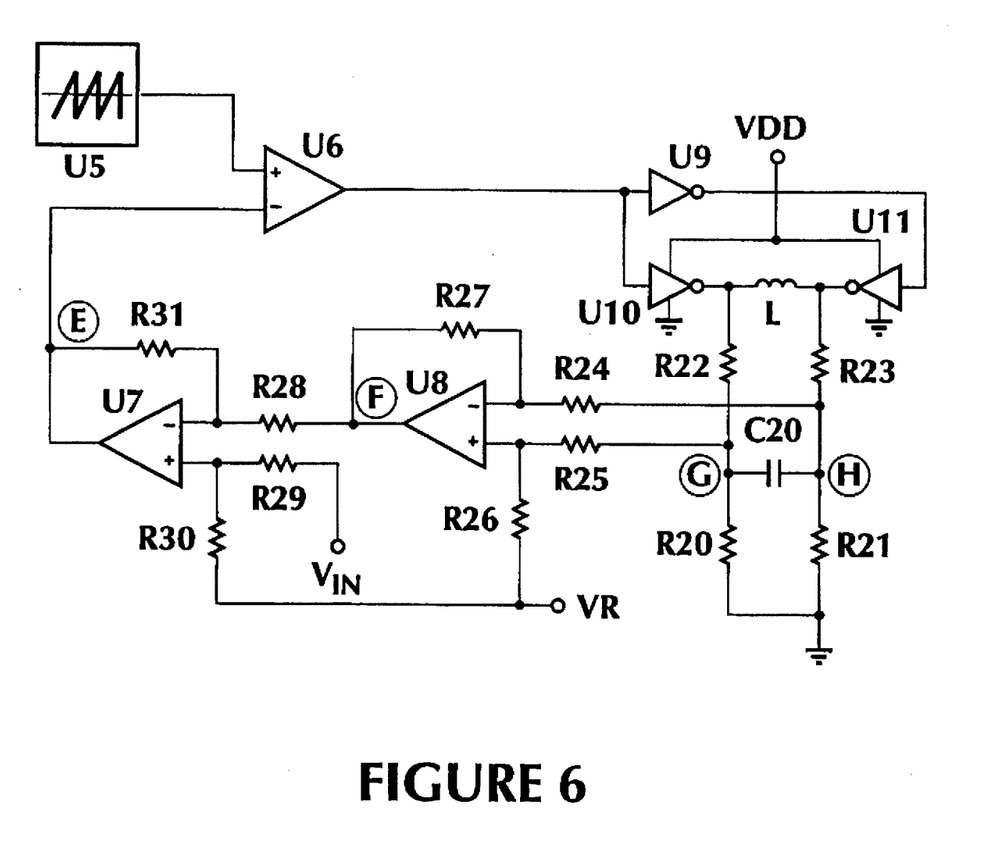
FIG. 6 shows a more detailed schematic diagram of the feedback circuit for generating the motor drive signals.

FIG. 6 shows a more detailed schematic diagram of the feedback circuit for generating the motor drive signals. A sawtooth generator U5 is coupled to deliver a sawtooth waveform to a non-inverting input to a comparator U6. An output of the comparator U6 is coupled to an input to an inverter U9 and coupled to an input to an inverting driver U10. An output of the inverter U9 is coupled to an input to an inverting driver U11. The inverting driver U10 and the inverting driver U11 are coupled to the high voltage supply node VDD and to the ground node for powering the motor winding L.

An output of the inverting driver U10 is coupled to a first terminal of a motor winding L and to a first terminal of a resistor R22. An output of the inverting driver U11 is coupled to a second terminal of the motor winding L and to a first terminal of a resistor R23. A second terminal of the resistor R23 is coupled to a first terminal of a resistor R24, to a first terminal of a capacitor C20 and coupled to a first terminal of a resistor R21, comprising a node H. A second terminal of the resistor R22 is coupled to a first terminal of a resistor R25, to a second terminal of the capacitor C20 and to a first terminal of a resistor 20, comprising a node G. A second terminal of the resistor R20 and second terminal of the resistor R21 are coupled to the ground node.

A second terminal of the resistor R25 is coupled to a first terminal of a resistor R26 and to a non-inverting input to an amplifier U8. A second terminal of the resistor R26 is coupled to a reference voltage level VR. A second terminal of the resistor R24 is coupled to a first terminal of a resistor R27 and to an inverting input to the amplifier U8. An output of the amplifier U8 is coupled to a second terminal of the resistor R27 and to a first terminal of a resistor R28, comprising a node F. A second terminal of the resistor R28 is coupled to a first terminal of a resistor R31 and to an inverting input to an amplifier U7.

A first terminal of a resistor R29 is coupled to a first terminal of a resistor R30 and coupled to a non-inverting input to the amplifier U7. A second terminal of the resistor R30 is coupled to the reference voltage level VR. A second terminal of the resistor R29 is coupled to receive an input signal Vin. An output of the amplifier U7 is coupled to a second terminal of the resistor R31 and to an inverting input to the comparator U6. Preferably, R22 and R23 have an equal resistance of RX and R20 and R21 have an equal resistance of RY.

The circuit shown in FIG. 6 provides a means for applying an input signal Vin (generally for this invention, Vin is a sine wave) and to have the input signal Vin driven differentially across a motor winding L with a gain of RX/RY. A feedback loop forces the differential signal at node G and H to equal the input signal Vin, with gain RX/RY.

The sawtooth generator of FIG. 6 corresponds to the PWM ramp circuit 116 of FIG. 1; the comparator U6 corresponds to the PWM comparator 117 or 113; the inverter and inverting drivers U9–U11 correspond to the H-bridge; the amplifier U8 corresponds to the sample amplifier 114 or 112; the amplifier U7 corresponds to the error amplifier 115 or 111. The circuits shown in FIG. 1 and FIG. 2 comprise two such circuits as shown in FIG. 6; one for the 0° phase shifted signal and one for the 60° phase shifted signal.

Preferably, the inverting drivers U10 and U11 are high current and high voltage MOS inverters. The inverter U9 allows U10 and U11 to operate as an H-bridge (i.e. the output of U10 is high when the output of U11 is low and the output of U10 is low when the output of U11 is high). The resistors R20–23 attenuate the high motor voltages to levels suitable for integrated circuit control (i.e. less than 12 volts). The amplifiers U8 and U7 are configured as difference amplifiers by the arrangement of resistors coupled to them. The amplifier U8 receives the difference of signals at the nodes G and H and provides a sampled difference signal referenced to VR at the node F.

The amplifier U7 receives the sampled difference signal form the node F and the input signal Vin to form an error signal at the node E. The comparator U6 receives the sawtooth waveform from U5, which is centered about VR and the error signal at node E and forms a sinusoidally modulated square wave at its output for driving the H-bridge.

Figure 7:
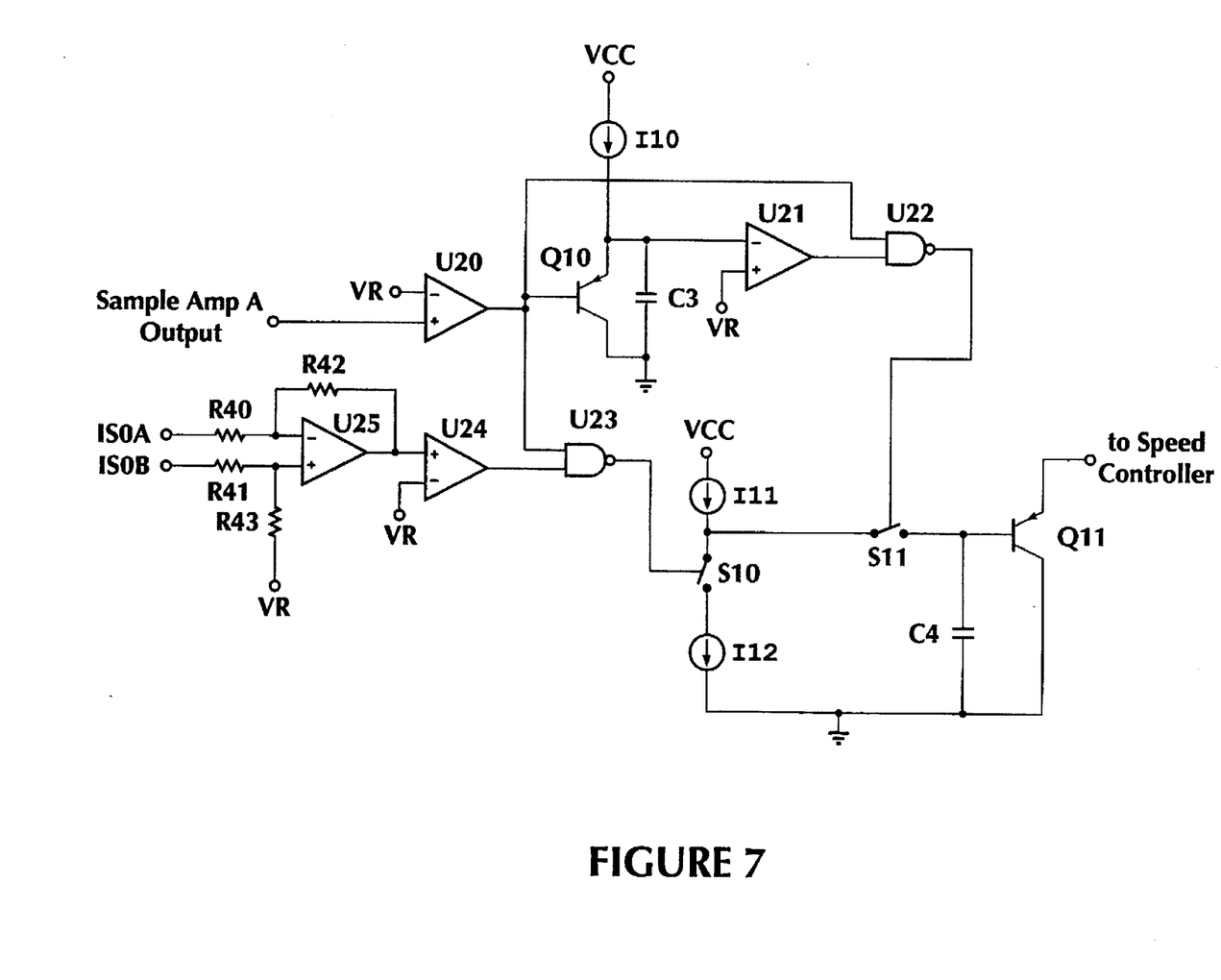
FIG. 7 shows a detailed schematic diagram of the slip control circuit.

FIG. 7 shows a detailed schematic diagram of the slip control circuit. The output from the sample amplifier 114 (FIG. 1) is coupled to an non-inverting input to a comparator U20. A reference voltage VR is coupled to an inverting input to the comparator U20. An output of the comparator U20 is coupled to a first input to a NAND gate U22, to a first input to a NAND gate U23 and coupled to a base of a pnp bipolar transistor Q10. A collector of the transistor Q10 is coupled to the ground node. A first terminal of a current source I10 is coupled to the node VCC. A second terminal of the current source I10 is coupled to an emitter of the transistor Q10, to a first terminal of the capacitor C3 (FIG. 1) and coupled to an inverting input to a comparator U23. The current source I10 sources a current which varies linearly with motor speed (motor winding signal frequency).

A second terminal of the capacitor C3 is coupled to the ground node (as in FIG. 1). A non-inverting input to the comparator U21 is coupled to a reference voltage VR. An output of the comparator U21 is coupled to a second input to the NAND gate U22. The ISOA terminal of the transducer AB (FIG. 2) is coupled to a first terminal of a resistor R40. A second terminal of the resistor R40 is coupled to an inverting input to an amplifier U25 and to a first terminal of a resistor R42. A second terminal of the resistor R42 is coupled to an output of the amplifier U25 and to a non-inverting input to a comparator U24. An ISOB terminal of the transducer AB (FIG. 2) is coupled to a first terminal of a resistor R41. A second terminal of the resistor R41 is coupled to a non-inverting input to the amplifier U25. An inverting input to the comparator U24 is coupled to a reference voltage level VR.

An output of the comparator U24 is coupled to a second input to the NAND gate U23. An output of the NAND gate U23 is coupled to control a switch S10. A first terminal of the switch S10 is coupled to a first terminal of a current source I11 and to a first terminal of a switch S11. A second terminal of the current source I11 is coupled to the node VCC. A second terminal of the switch S10 is coupled to a first terminal of a current source I12. A second terminal of the current source I12 is coupled to the ground node.

Preferably, the current source I12 sources twice as much current as the current source I11.

A second terminal of the switch S11 is coupled to a first terminal of the capacitor C4 (FIG. 2) and to a base of a pnp bipolar transistor Q11. A second terminal of the capacitor C4 is coupled to the ground node (as in FIG. 2). A collector of the transistor Q11 is coupled to the ground node. An emitter of the transistor Q11 is coupled to the speed controller 102 (FIG. 1) for controlling the motor voltages.

Figure 8:
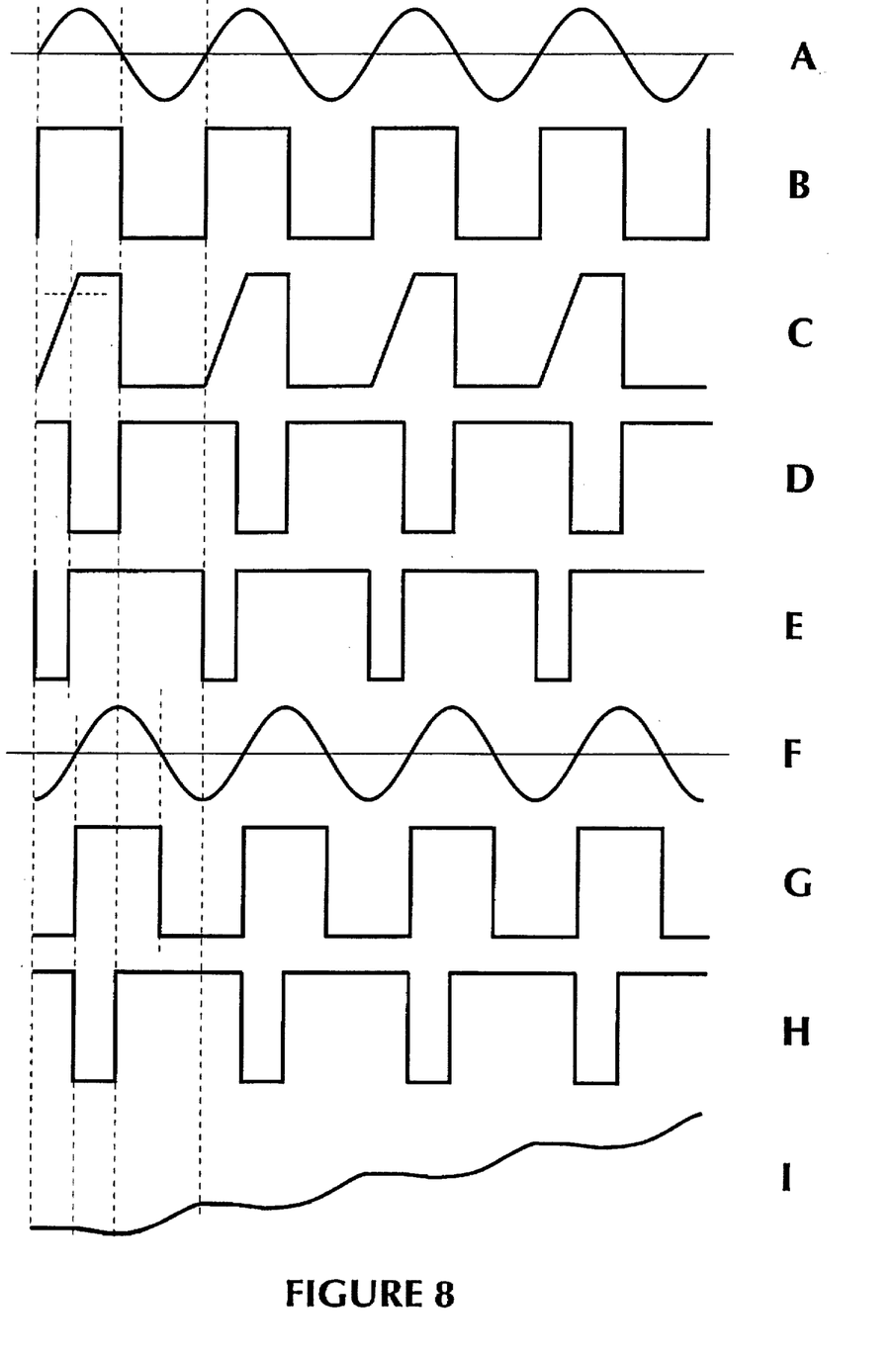
FIG. 8 shows waveforms for the slip control circuit.

FIG. 8 shows waveforms for the slip control circuit. Referring to FIGS. 7 and 8, the sample amplifier 114 is coupled to provide a difference signal to the comparator U20. The difference signal is shown in FIG. 8A. The output of the comparator U20 drives the transistor Q10 and the NAND gates U24 and U23. The output of the comparator U20 is shown in FIG. 8B. When the output of the comparator U20 is high, current from the current source I10 flows into the capacitor C3. When the output of the comparator U24 is low, the capacitor C4 is discharged through the transistor Q10. FIG. 8C shows the voltage on the capacitor C3. The comparator U21 compares the voltage on C3 to a reference voltage VR and outputs an edge delayed version of the output of the comparator U20 as shown in FIG. 8D.

The NAND gate U22 performs a NAND operation on the output of the comparator U20 and the output of the comparator U21. This forms a "sample window" waveform as shown in FIG. 8E at the output of the NAND gate U22. The purpose of the sample window is to provide a slip reference angle which will be relatively constant with changing frequency. This is important because variable speed operation requires changing the drive frequency, and therefore, the slip reference must stay constant in order to maintain a linear speed control with constant slip.

FIG. 8F shows the voltage across the motor winding that the current measurement is taken from (i.e. the winding coupled to the transducer AB). This voltage signal is converted to a square wave by the comparator U24, as shown in FIG. 8G. The NAND gate U23 performs the NAND operation on the outputs of the comparator U20 and the output of the comparator U24, as shown in FIG. 8H. The duty cycle of the signal at the output of the NAND gate U23 is proportional to the phase angle between the voltage and current in the motor winding. When the sample window is high and the output of U23 is high, the capacitor C4 is charged. When the output of the comparator U23 is low, the capacitor C4 is discharged. When the sample window is low, the capacitor C4 holds its charge. The capacitor voltage is represented in FIG. 8I.

The capacitor C4 is coupled to the transistor Q11. The transistor Q11 is coupled to the speed control circuit 102 (FIG. 1) to control the motor winding voltages. The motor voltages are increased until the phase difference between the voltage and current in the winding is such that there are equal charge and discharge times for the capacitor C4. If the phase difference is too large or too small, the voltage on the capacitor C4 will increase or decrease to maintain the proper phase angle and speed. The phase angle is adjustable by changing the value of C3.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiments chosen for illustration without departing from the spirit and scope of the invention.

Specifically, it will be apparent to one of ordinary skill in the art that the device of the present invention could be implemented in several different ways and the apparatus disclosed above is only illustrative of the preferred embodiment of the invention and is in no way a limitation. For example, it would be within the scope of the invention to vary the values of the various components and voltage levels disclosed herein. It will be apparent that transistors of one type, such as NMOS, PMOS, bipolar pnp or bipolar npn can be interchanged with a transistor of another type, and in some cases interchanged with diodes, with appropriate modifications, and so forth. Also a switch may be implemented with a transistor of any type.

What is claimed is:

1. A circuit for controlling power to a three-phase induction motor, the circuit comprising:
   a. first means for generating a first signal having the form $Vdc+A \sin(2\pi ft-0°)$;
   b. second means for generating a second signal having the form $Vdc+A \sin(2\pi ft+60°)$ coupled to the first means for generating;
   c. means for forming a third signal by pulse-width modulating a fourth signal representative of a difference between a first difference between two motor winding voltages and the first signal;
   d. means for forming a fifth signal by pulse-width modulating a sixth signal representative of a difference between a second difference between two motor winding voltages and the second signal; and
   e. means for driving the motor coupled to receive the third signal and the fifth signal for generating six motor drive control signals.

2. The circuit for controlling power according to claim 1 wherein the second means for generating a second signal having the form $Vdc+A \sin(2\pi ft+60°)$ comprises a combining circuit coupled to receive the first signal having the form $Vdc+A \sin(2\pi ft-0°)$ and coupled to receive a seventh signal having the form $Vdc+A \sin(2\pi ft-90°)$.

3. The circuit for controlling power according to claim 1 wherein the means for driving the motor comprises:
   a. a multiplexor coupled to receive the third signal and the fifth signal for forming a first multiplexed signal and a second multiplexed signal;
   b. a first plurality of drivers coupled to receive the first multiplexed signal; and
   c. a second plurality of drivers coupled to receive the second multiplexed signal.

4. The circuit for controlling power according to claim 3 further comprising a circuit for powering three windings in the motor comprising an H-bridge arrangement coupled to the first plurality of drivers and coupled to the second plurality of drivers for providing power to windings of the motor.

5. The circuit for controlling power according to claim 1 wherein the first means and the second means comprise a multiplexor coupled to control a direction of motor rotation and further wherein the means for driving the motor comprises:
   a. a first plurality of driver coupled to receive the third signal;
   b. a second plurality of drivers coupled to receive the fifth signal.

6. The circuit for controlling power according to claim 1 wherein an amplitude of the motor winding voltages are controlled depending upon a slip angle.

7. A circuit for controlling power to a three-phase AC motor, the circuit comprising:
   a. a first generator circuit for forming a first sinusoidal signal wherein the first sinusoidal signal has first phase angle;
   b. a second generator circuit for forming a second sinusoidal signal wherein the second sinusoidal signal has a second phase angle and further wherein the first phase angle differs from the second phase angle by ninety degrees;

c. a combining circuit coupled to receive the first sinusoidal signal and coupled to receive the second sinusoidal signal for forming a combined sinusoidal signal having a third phase angle wherein the third phase angle differs from the first phase angle by sixty degrees;

d. a first sampling circuit coupled to receive a first winding voltage of the motor and a second winding voltage of the motor for forming a first difference signal;

e. a second sampling circuit coupled to receive the second winding voltage of the motor and a third winding voltage of the motor for forming a second difference signal;

f. a first amplifier circuit coupled to compare the first sinusoidal signal to the first difference signal;

g. a second amplifier circuit coupled to compare the combined sinusoidal signal to the second difference signal;

h. a third generator circuit forming a periodic signal coupled to a third amplifier circuit wherein the third amplifier circuit is coupled to compare the periodic signal to the first difference signal for forming a first PWM signal;

i. a fourth amplifier circuit coupled to compare the periodic signal to the second difference signal for forming a second PWM signal; and j. a driver circuit coupled to receive the first PWM signal and the second PWM signal for controlling a first winding current, a second winding current and a third winding current.

8. The circuit for controlling power according to claim 7 wherein the first winding voltage, the second winding voltage and the third winding voltage are each controlled depending upon a slip angle.

9. The circuit for controlling power according to claim 7 wherein the combining circuit comprises:

a. a first resistor having a first terminal and a second terminal and a resistance value of approximately R($\sqrt{3}+1$) wherein the first terminal is coupled to receive the first sinusoidal signal;

b. a second resistor having a third terminal and a fourth terminal and a resistance value of R wherein the third terminal is coupled to the second terminal and wherein the fourth terminal is coupled to a voltage source;

c. a fifth amplifier circuit having an inverting input, a non-inverting input and an output wherein the non-inverting input is coupled to the second terminal and the third terminal;

d. a third resistor having a fifth terminal and a sixth terminal and a resistance value of approximately 2 R divided by the square root of three wherein the fifth terminal is coupled to receive the second sinusoidal signal; and e. a fourth resistor having a seventh terminal and an eighth terminal wherein the seventh terminal is coupled to the sixth terminal and to the inverting input and further wherein the eighth terminal is coupled to the output for providing the third sinusoidal signal.

10. A method of controlling power to a three-phase induction motor comprising the steps of:

a. forming a first signal having a sinusoidal waveform;

b. forming a second signal having a sinusoidal waveform wherein the second signal is 60 degrees apart in phase from the first signal;

c. forming a third signal by pulse-width modulating a fourth signal representative of a difference between a first difference between two motor winding voltages and the first signal;

d. forming a fifth signal by pulse-width modulating a sixth signal representative of a difference between a second difference between two motor winding voltages and the second signal; and e. generating six motor drive control signals for driving the motor based upon the third signal and the fifth signal.

11. The method according to claim 10 wherein the step of forming the second signal comprises the step of combining the first signal with a sixth signal having a sinusoidal waveform 90 degrees apart in phase from the first signal.

12. The method according to claim 10 further comprising the step of controlling an amplitude of the motor winding voltages depending upon a slip angle.

13. The method according to claim 10 wherein the step of generating the six motor drive control signals comprises:

a. forming a seventh signal and an eighth signal by multiplexing the third signal and the fifth signal;

b. generating a first plurality of motor drive control signals based upon the seventh signal;

c. generating a second plurality of motor drive control signals based upon the eighth signal.

14. The method according to claim 13 further comprising the step of providing power to windings of the motor using an H-bridge arrangement.

15. The method according to claim 10 further comprising the step of interchanging the first signal and the second signal depending upon a logic level of an input to a multiplexor and further wherein the step of generating the six motor drive control signals comprises:

a. generating a first plurality of motor drive control signals based upon the third signal; and b. generating a second plurality of motor drive control signals based upon the fifth signal.

16. The method according to claim 15 further comprising the step of providing power to windings of the motor using an H-bridge arrangement.

17. A method of controlling power to a three-phase induction motor comprising the steps of:

a. forming a first pair of sinusoidal signals 90 degrees apart in phase;

b. combining the first pair of sinusoidal signals together for forming a second pair of sinusoidal signals 60 degrees apart in phase;

c. forming a third pair of sinusoidal signals representative of differences between motor voltage signals;

d. forming a fourth pair of pulse width modulated signals representative of differences between the second pair of signals and the third pair of signals; and e. driving the motor with a driver circuit wherein the driver circuit is coupled to receive the fourth pair of signals.

18. The method according to claim 17 further comprising the step of adjusting the motor voltage signals depending upon a slip angle.

19. The method according to claim 17 further comprising the step of interchanging the signals of the second pair depending upon a desired direction of motor rotation.

20. The method according to claim 17 wherein the driver circuit comprises an H-bridge arrangement.

* * * * *